(12) United States Patent
Johnson et al.

(10) Patent No.: US 7,954,761 B2
(45) Date of Patent: Jun. 7, 2011

(54) MODULAR INTEGRATED GALLEY

(75) Inventors: Glenn A. Johnson, King, NC (US);
Craig Cunningham, Old Northants (GB); Jenny Wilson, Northamptonshire (GB)

(73) Assignee: BE Aerospace, Inc., Wellington, FL (US)

( * ) Notice: Subject to any disclaimer, the term of this patent is extended or adjusted under 35 U.S.C. 154(b) by 786 days.

(21) Appl. No.: 11/946,629

(22) Filed: Nov. 28, 2007

(65) Prior Publication Data
US 2008/0129159 A1 Jun. 5, 2008

Related U.S. Application Data

(60) Provisional application No. 60/867,957, filed on Nov. 30, 2006.

(51) Int. Cl.
*B64D 11/04* (2006.01)
(52) U.S. Cl. ........................ 244/118.5; 244/120; 312/111
(58) Field of Classification Search ............... 244/118.1, 244/118.2, 118.5, 120; 186/40, 45, 47, 50, 186/51; 312/249.1, 249.8, 111, 107, 351; 52/282.2; 403/381; 220/480
See application file for complete search history.

(56) References Cited

U.S. PATENT DOCUMENTS

| | | | | |
|---|---|---|---|---|
| 4,021,973 A | * | 5/1977 | Hegg et al. | 52/36.6 |
| 4,022,404 A | | 5/1977 | Greiss | |
| 4,055,317 A | | 10/1977 | Greiss | |
| 2006/0145002 A1 | | 7/2006 | Van Loon | |
| 2007/0228216 A1 | * | 10/2007 | Wenstrom | 244/118.5 |
| 2008/0001031 A1 | | 1/2008 | Doebertin et al. | |

FOREIGN PATENT DOCUMENTS
GB 18180 11/1914
WO 2004/071867 A1 8/2004
* cited by examiner

*Primary Examiner* — Tien Dinh
*Assistant Examiner* — Richard R Green
(74) *Attorney, Agent, or Firm* — Oliff & Berridge, PLC

(57) ABSTRACT

A modular integrated galley used for food preparation and storage in a passenger vehicle includes a mounting rack defining a plurality of openings or spaces and having a plurality of structural mounting points disposed within the spaces for receiving a plurality of individual galley modules. Each of the galley modules including a generally box-like outer shell having top, bottom, front, rear, and side walls. At least two of the galley modules having a different functional component contained within the outer shell that is selected from the group consisting of a beverage maker, a water dispensing unit, an oven, a refrigerator and a storage compartment. The modular integrated galley further including means for interconnecting adjacent galley modules including an elongate connecting rail defining an outer perimeter having at least two slots formed along the outer perimeter for receiving complimentary ribs on adjacent galley modules.

11 Claims, 4 Drawing Sheets

MODULAR INTEGRATED GALLEY

CROSS-REFERENCE TO RELATED APPLICATION

This application claims the benefit of U.S. Provisional Application No. 60/867,957 filed Nov. 30, 2006.

TECHNICAL FIELD AND BACKGROUND OF THE INVENTION

This invention relates to interior equipment for vehicles, and more particularly to galley units used for food preparation and storage in a passenger vehicle.

Many vehicles, such as trains, buses, and aircraft, include one or more galley units for preparing and storing food. These galley units provide several different functions, such as food storage, refrigeration, heating, and liquid-handling, in various combinations. The type and quantity of equipment included in each galley unit varies depending on the size and configuration of the vehicle. As such, a unique galley unit must be constructed for each vehicle, resulting in increased time, labor and expense.

Accordingly, there is a need for a galley unit used in food preparation and storage in a passenger vehicle which can be easily produced in various configurations.

SUMMARY OF THE INVENTION

The above-mentioned need is met by the present invention, which provides a modular integrated galley built up from a plurality of individual galley modules.

In one aspect, the present invention provides a modular integrated galley for a passenger vehicle including a mounting rack defining a plurality of spaces and a plurality of individual galley modules. Each of the galley modules is adapted to be mounted on the mounting rack and received within one of the spaces. At least two of the galley modules have a different configuration selected from the group consisting of a beverage maker, a water dispensing unit, an oven, a refrigerator and a storage compartment. The modular integrated galley further includes at least one connecting rail configured to interconnect adjacent galley modules. The mounting rack includes a plurality of structural mounting points and the galley modules have complimentary attachment members for making a structural connection between the galley module and the mounting rack.

In another aspect, the mounting rack of the modular integrated galley includes at least one vehicle utility connection having a quick-connect fitting disposed within at least one of the spaces and at least one of the galley modules has a complimentary quick-connect fitting for making a connection between the vehicle utility connection and the galley module. The at least one vehicle utility connection is selected from the group, consisting of an electrical power connector, a potable water supply connector and a waste water drain.

In yet another aspect, the present invention provides a galley unit for a passenger vehicle including a mounting rack defining a plurality of spaces and having a plurality of structural mounting points disposed within the spaces. The galley unit further includes a plurality of galley modules, each including a generally box-like outer shell having top, bottom, front, rear, and side walls. Each of the galley modules is adapted to be received within one of the spaces and mounted on at least one of the structural mounting points of the mounting rack. At least two of the galley modules have a different functional component contained within the outer shell. The galley unit further includes means for interconnecting adjacent galley modules consisting of at least one elongate connecting rail defining an outer perimeter. At least two slots are formed along the outer perimeter of the connecting rail for receiving complimentary ribs on the adjacent galley modules.

BRIEF DESCRIPTION OF THE DRAWINGS

The present invention may be best understood by reference to the following description taken in conjunction with the accompanying drawing figures in which.

DESCRIPTION OF THE PREFERRED EMBODIMENTS AND BEST MODE

Figure 1:
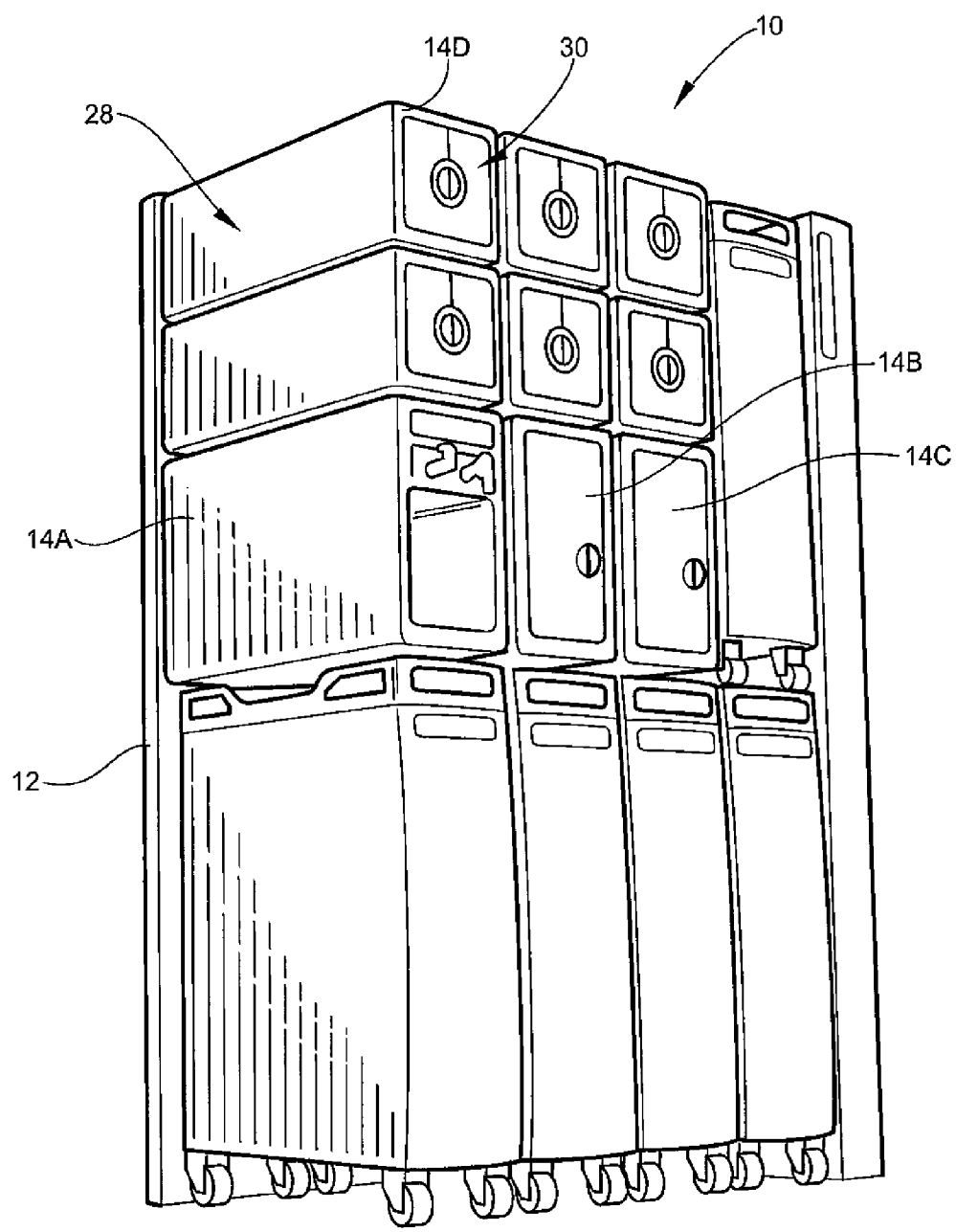
FIG. 1 is a perspective view of a modular integrated galley built up from a plurality of individual galley modules according to one aspect of the invention.

Referring now specifically to the drawing figures wherein identical reference numerals denote the same elements throughout the various views, an exemplary galley unit 10 used for food preparation and storage in a passenger vehicle and constructed according to the present invention is illustrated in FIG. 1. The basic components of the galley unit 10 are an upright structural support or mounting rack 12 and a plurality of individual galley modules 14. A galley unit 10 comprising a plurality of individual galley modules 14 is also referred to herein as a "modular integrated galley."

Figure 2:
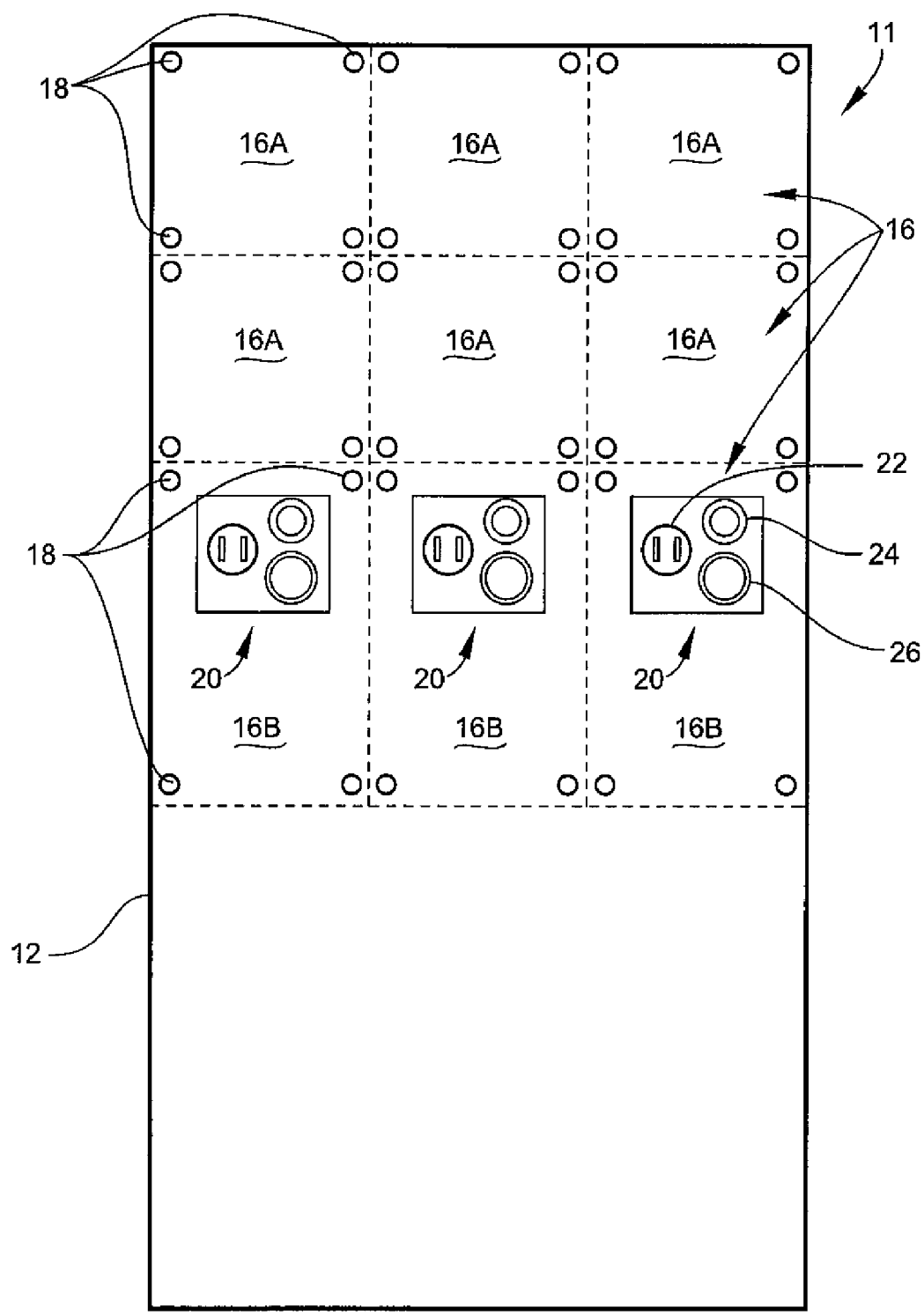
FIG. 2 is a front view of a mounting rack of the modular integrated galley of FIG. 1.

The mounting rack 12 may be a free-standing structure, or it may be integrated into a portion of the vehicle, such as a bulkhead (not shown). FIG. 2 illustrates the front face of the mounting rack 12. The front face 11 of the mounting rack 12 includes openings or spaces 16 for receiving the modules 14. In the illustrated example, the upper spaces 16A include structural mounting points 18, such as female threaded inserts or the like, configured to receive complementary bolts (not shown) provided on the modules 14. Hooks, brackets, latches, or fasteners other than bolts could also be used to make a structural connection between the modules 14 and the mounting rack 12. The lower spaces 16B include similar structural mounting points 18, as well as vehicle utility connections 20, such as an electrical power connector 22, a potable water supply connector 24, and a waste water drain 24. The vehicle utility connections 20 are configured with known types of quick-connect fittings that mate with complementary fittings provided on a module 14 as the module is pushed into place in the mounting rack 12. The size and arrangement of the spaces 16, as well as the selection and arrangement of spaces 16B that include vehicle utility connections 20, may be varied to suit a particular need or application.

Referring again to FIG. 1, each of the modules 14 comprises a generally box-like outer shell 28 with top, bottom, front, rear, and side walls. The rear wall includes hooks, brackets, latches, fasteners, or other attachment structures (not shown) configured to attach the outer shell 28 to the structural mounting points 18. As depicted herein, the modules 14 are generally square or rectangular in cross-section, but other shapes may be used as well. The functional components of the modules 14 are contained within the shells 28. For example, the module 14A is a beverage maker and/or water dispensing unit which includes equipment for storing, heating, cooling, and/or dispensing liquids. The module 14B is an oven (e.g. microwave) which includes heating elements and temperature controls for reheating food items, such as prepackaged meals. The module 14C is a refrigerator which includes a cooling mechanism for storing foods and beverages at lower temperatures. The modules 14D are storage compartments for storing food and beverage items, condiments, utensils, and the like.

The modules 14 may include one or more removable compartments or components to facilitate loading, unloading, or maintenance. For example, the module 14D may include an inner compartment 30 which can be removed and replaced without disturbing (e.g. removing) the outer shell 28 of the module. Furthermore, the functional components of the modules, such as the beverage maker 14A, may be configured as line-replaceable units (LRUs), to allow repair or replacement without removing the entire module 14A.

Figure 3:
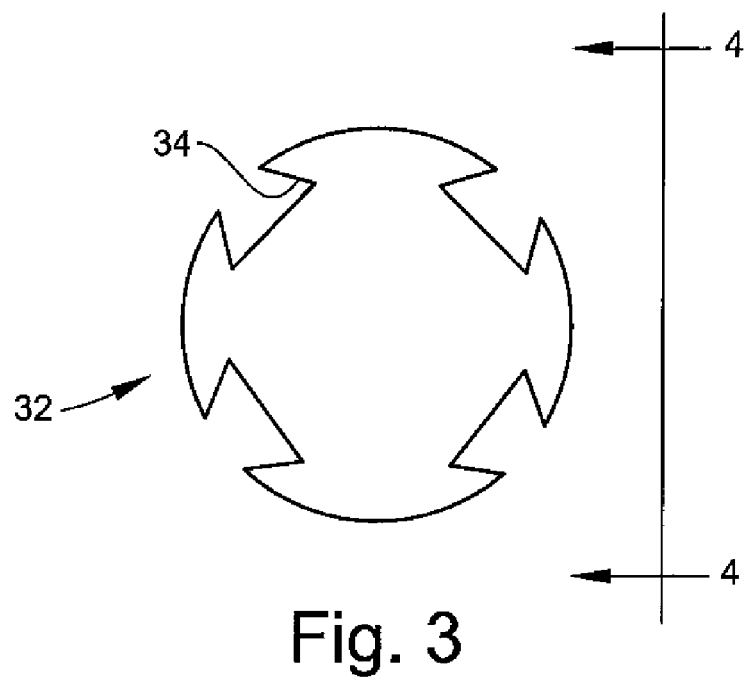
FIG. 3 is an end view of a connecting rail for use with the modular integrated galley of FIG. 1.
Figure 4:
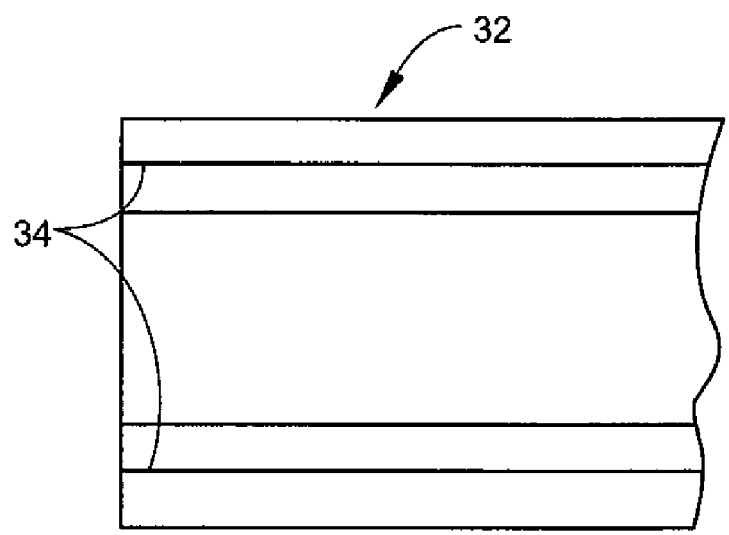
FIG. 4 is a side view of the connecting rail of FIG. 3 taken from the direction indicated by the line 4-4 in FIG. 3.
Figure 5:
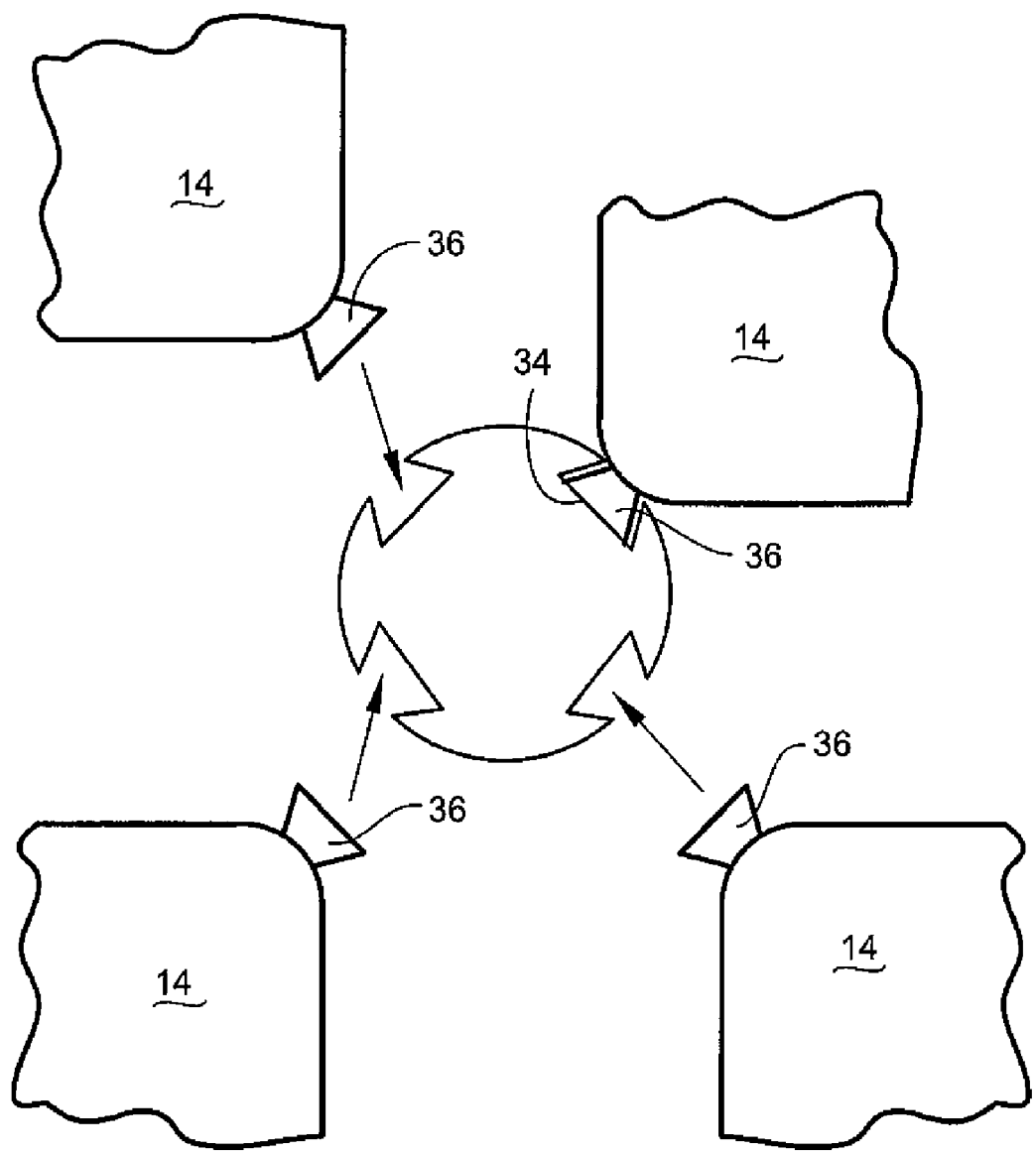
FIG. 5 is a partial front view of a plurality of individual galley modules being attached to the connecting rail of FIG. 3.

Means are provided for interconnecting adjacent individual modules 14. For example, FIGS. 3-5 illustrate a connecting rail 32 which includes dovetail slots 34 formed along its outer perimeter. The slots 34 receive dovetail ribs 36 carried on the module 14, either as separate items or integrally-formed with the outer shell 28 of the module. As shown in FIG. 5, the connecting rail 32 may be slid into engagement with a group of up to four modules 14 to form a solid connection. Additional connecting rails 32 are used between the remaining modules 14. Thus connected, the modules 14 provide mutual support to each other against bending, sliding, twisting, etc. during use. As such, no external structure is required to support the modules 14 once they are attached to the mounting rack 12 and interconnected with a connecting rail 32, as described above. Any suitable structure effective to interconnect the modules 14 may be substituted for the connecting rails 32. If desired, an outer housing, cover, or trim member may be placed around the modules 14 for aesthetic purposes.

The galley unit 10 is made, or built up, by attaching the desired combination of modules 14 to the mounting rack 12, and then interconnecting adjacent modules 14 using connecting rails 32. The selection of the types and sizes of the individual galley modules 14 may be chosen as desired or needed for a particular vehicle, and different functional modules 14 may be used in a single mounting rack 12 without having to reconfigure the vehicle utility connections 20 provided on the mounting rack. Accordingly, a modular integrated galley built up from a plurality of individual galley modules constructed according to the invention allows for the economical construction of customized galley units 10.

A modular integrated galley, or galley unit, is described hereinabove. Various details of the invention may be changed without departing from its scope. Furthermore, the foregoing description of the preferred embodiments of the invention and the best mode for practicing the invention are provided for the purpose of illustration only, and not for the purpose of limitation.

That which is claimed is:

1. A modular integrated galley in a passenger vehicle, comprising:
    a mounting rack in the form of a vertical wall defining a plurality of spaces for receiving a plurality of modules, each of the spaces having at least one of a mounting point for receiving a module fastener and a utility connection;
    a plurality of individual galley modules each having a box-like outer shell, each of the galley modules adapted to be mounted on and removed from the mounting rack independently of other modules and received within one of the spaces, at least two of the galley modules having a different configuration, and each of the galley modules having a rib carried on one exterior corner of its outer shell and projecting in a direction outward from the sides of the shell; and
    at least one connecting rail positioned generally centered between adjacent corners of adjacent galley modules configured to interconnect adjacent galley modules, each of the connecting rails having a disk shape including equally spaced-apart slots defined therein around its outer periphery, each slot configured to receive a single rib of a galley module, and wherein each connecting rail does not receive more than one rib from the same galley module.

2. A modular integrated galley according to claim 1, wherein the mounting rack comprises a plurality of structural mounting points and the galley modules comprise complimentary attachment members for making a structural connection between the galley module and the mounting rack.

3. A modular integrated galley according to claim 2, wherein the attachment members are selected from the group consisting of bolts, hooks, brackets, latches and screws.

4. A modular integrated galley according to claim 1, wherein the mounting rack comprises at least one vehicle utility connection having a quick-connect fitting disposed within at least one of the spaces and wherein at least one of the galley modules comprises a complimentary quick-connect fitting for making a connection between the vehicle utility connection and the galley module.

5. A modular integrated galley according to claim 4, wherein the at least one vehicle utility connection is selected from the group, consisting of an electrical power connector, a potable water supply connector and a waste water drain.

6. A modular integrated galley according to claim 1, wherein the different galley modules are selected from the group consisting of a beverage maker, a water dispensing unit, an oven, a refrigerator and a storage compartment.

7. A modular integrated galley according to claim 1, wherein at least one of the galley modules comprises a removable compartment.

8. A modular integrated galley according to claim 1, wherein the connecting rail defines an outer perimeter and has at least two slots formed along the outer perimeter and wherein at least two of the galley modules have a complimentary rib that is received within a corresponding slot on the outer perimeter of the connecting rail to interconnect adjacent galley modules.

9. A modular integrated galley according to claim 8, wherein the slots formed on the outer perimeter of the connecting rail and the complimentary ribs on the galley modules are dovetail-shaped.

10. A modular integrated galley according to claim 1, wherein each of the modules comprises a generally box-like outer shell having top, bottom, front, rear, and side walls.

11. A galley unit in a passenger vehicle, comprising:
    a mounting rack in the form of a vertical wall defining a plurality of spaces and having a plurality of structural mounting points disposed within the spaces;
    a plurality of galley modules, each of the galley modules comprising a generally box-like outer shell having top, bottom, front, rear, and side walls, each of the galley modules adapted to be received within one of the spaces and mounted on and removed from at least one of the structural mounting points of the mounting rack independently of other modules, at least two of the galley modules having a different functional component contained within the outer shell, each of the galley modules having a rib carried on one exterior corner of its outer shell and projecting in a direction outward from the sides of the shell; and at least one connecting rail positioned generally centered between adjacent corners of adjacent galley modules configured to interconnect the adjacent galley modules, each of the connecting rails having a disk shape including equally spaced-apart slots defined therein around its outer periphery, each slot configured to receive a single rib of a galley module, and wherein each connecting rail does not receive more than one rib from the same galley module.

\* \* \* \* \*